US008331019B2

(12) United States Patent
Cheong et al.

(10) Patent No.: US 8,331,019 B2
(45) Date of Patent: Dec. 11, 2012

(54) HOLOGRAPHIC MICROSCOPY OF HOLOGRAPHICALLY TRAPPED THREE-DIMENSIONAL NANOROD STRUCTURES

(75) Inventors: Fook Chiong Cheong, New York, NY (US); David G. Grier, New York, NY (US); Sang-Hyuk Lee, Albany, CA (US)

(73) Assignee: New York University, New York, NY (US)

( * ) Notice: Subject to any disclaimer, the term of this patent is extended or adjusted under 35 U.S.C. 154(b) by 364 days.

(21) Appl. No.: 12/759,839

(22) Filed: Apr. 14, 2010

(65) Prior Publication Data

US 2010/0253762 A1 Oct. 7, 2010

Related U.S. Application Data

(63) Continuation-in-part of application No. 12/020,376, filed on Jan. 25, 2008, now Pat. No. 7,839,551.

(60) Provisional application No. 60/897,784, filed on Jan. 26, 2007.

(51) Int. Cl.
*G02B 21/00* (2006.01)

(52) U.S. Cl. ........................... 359/368; 359/15; 359/385

(58) Field of Classification Search .................... 359/15, 359/368, 385, 577, 902; 348/40; 382/275
See application file for complete search history.

(56) References Cited

U.S. PATENT DOCUMENTS

| | | | | |
|---|---|---|---|---|
| 6,624,940 | B1 | 9/2003 | Grier et al. | |
| 7,133,203 | B2 | 11/2006 | Grier et al. | |
| 7,233,423 | B2 | 6/2007 | Grier | |
| 7,473,890 | B2 | 1/2009 | Grier et al. | |
| 2003/0021016 | A1 | 1/2003 | Grier | |
| 2004/0156098 | A1 | 8/2004 | Dubois et al. | |
| 2008/0285099 | A1 | 11/2008 | Knutson et al. | |
| 2009/0073563 | A1 | 3/2009 | Betzig | |
| 2009/0135432 | A1 | 5/2009 | Betzig | |
| 2010/0241357 | A1 * | 9/2010 | Chan et al. | 702/19 |
| 2012/0183947 | A1 * | 7/2012 | Mueth et al. | 435/2 |

FOREIGN PATENT DOCUMENTS

| | | | |
|---|---|---|---|
| CN | 1886684 | A | 12/2006 |
| WO | WO 2005/060431 | A2 | 7/2005 |

OTHER PUBLICATIONS

Denis et al., "Direct Extraction of the mean Particle Size from a Digital Hologram", *Applied Optics*, Feb. 10, 2006, pp. 944-952, vol. 45, No. 5, Optical Society of America.

(Continued)

*Primary Examiner* — Frank Font
(74) *Attorney, Agent, or Firm* — Foley & Lardner LLP

(57) ABSTRACT

A method and system for performing three-dimensional holographic microscopy of an optically trapped one dimensional structure. The method and system use an inverted optical microscope, a laser source which generates a trapping laser beam wherein the laser beam is focused by an objective lens into a plurality of optical traps. The method and system also use a collimated laser at an imaging wavelength to illuminate the structure created by the optical traps. Imaging light scattered by the optically tapped structure forms normalized intensity holograms that are imaged by a video camera and analyzed by optical formalisms to determine light field to reconstruct 3-D images for analysis and evaluation.

20 Claims, 9 Drawing Sheets

OTHER PUBLICATIONS

Guerrero-Viramontes et al., "3D Particle Positioning from CCD Images Using the Generalized Lorenz-Mie and Huygens-Fresnel Theories", *Meas. Sci. Technol*., 2006, pp. 2328-2334, vol. 17, IOP Publishing Ltd., United Kingdom.

Huang et al., "Optical Tweezers as Sub-Pico-Newton Force Transducers", *Optics Communication*, Aug. 1, 2001, pp. 41-48, vol. 195, Elsevier Science B.V.

Knöner, et al., "Measurement of the Index of Refraction of Single Microparticles", *Physical Review Letters*, 2006, pp. 157402-1-157402-4, vol. 97, The American Physical Society.

Lee et al., "Holographic Microscopy of Holographically Trapped Three-Dimensional Structures", *Optics Express*, Feb. 19, 2007, pp. 1505-1512, vol. 15, No. 4, Optical Society of America.

Moreno et al., "Particle Positioning from Charge-Coupled Device Images by the Generalized Lorenz-Mie Theory and Comparison with Experiment", *Applied Optics*, Oct. 1, 2000, pp. 5117-5124, vol. 39, No. 28, Optical Society of America.

Neuman et al., "Optical Trapping", *Review of Scientific Instruments*, Sep. 2004, pp. 2787-2809, vol. 75, No. 9, American Institute of Physics.

Park et al., "Fresnel Particle Tracing in Three Dimensions Using Diffraction Phase Microscopy", *Optics Letters*, Apr. 1, 2007, pp. 811-813, vol. 32, No. 7, Optical Society of America.

Pralle, et al., "Three-Dimensional High-Resolution Particle Tracking for Optical Tweezers by Forward Scattered Light", *Microscopy Research and Technique*, 1999, pp. 378-386, vol. 44, Wiley-Liss, Inc.

Pu et al., "Particle Field Characterization by Digital In-Line Holography: 3D Location and Sizing" *Experiments in Fluids*, 2005, pp. 1-9, vol. 39, Springer-Verlag.

Ray et al., "Precision of Light Scattering Techniques for Measuring Optical Parameters of Microspheres", *Applied Optics*, Sep. 20, 1991, pp. 3974-3983, vol. 30, No. 27, Optical Society of America.

Sheng et al., "Digital Holographic Microscope for Measuring Three-Dimensional Particle Distributions and Motions", *Applied Optics*, Jun. 1, 2006, pp. 3893-3901, vol. 45, No. 16, Optical Society of America.

Soulez et al., "Inverse Problem Approach in Particle Digital Holography: Out-of-Field Particle Detection Made Possible", Dec. 2007, pp. 3708-3716, vol. 24, No. 12, Optical Society of America.

Soulez et al., "Inverse-Problem Approach for Particle Digital Holography: Accurate Location Based on Local Optimization", Apr. 2007, pp. 1164-1171, vol. 24, No. 4, Optical Society of America.

Thompson, B. J., "Holographic Particle Sizing Techniques", *Journal of Physics E: Scientific Instruments*, 1974, pp. 781-788, vol. 7, Great Britain.

Zhang et al., "Reconstruction Algorithm for High-Numerical-Aperture Holograms with Diffraction-Limited Resolution", *Optics Letters*, Jun. 1, 2006, pp. 1633-1635, vol. 31, No. 11, Optical Society of America.

* cited by examiner

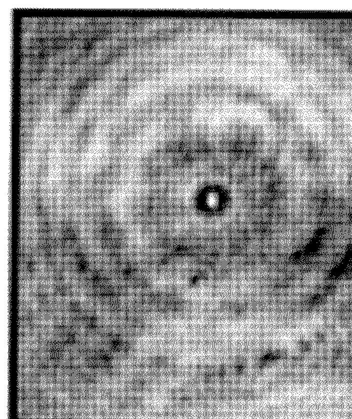
FIG. 3C
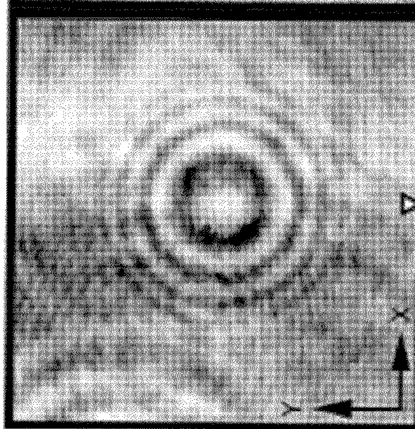
FIG. 3A
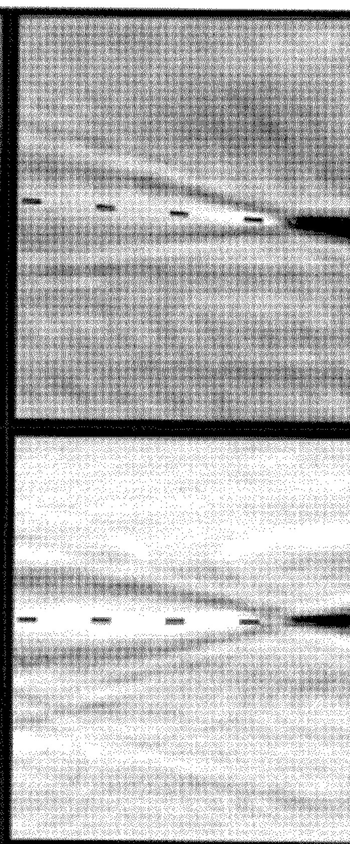
FIG. 3D
FIG. 3B
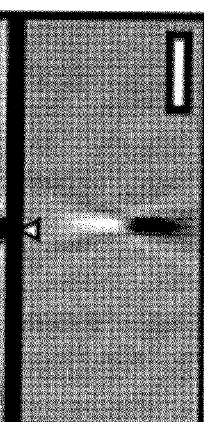
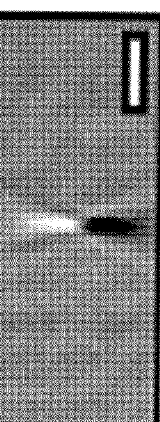
FIG. 3E

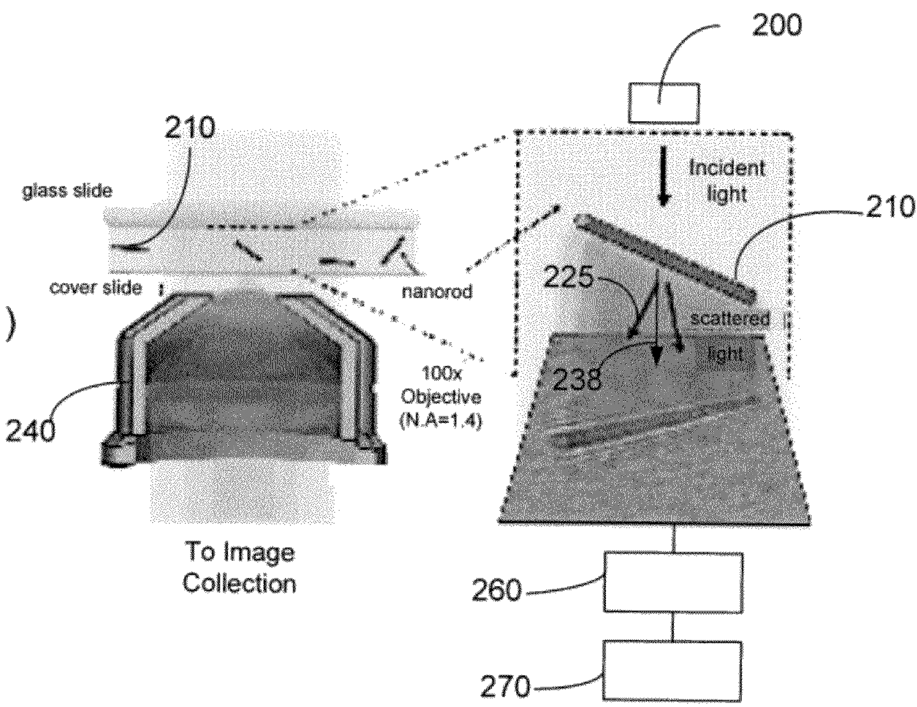
FIG. 5A(1)
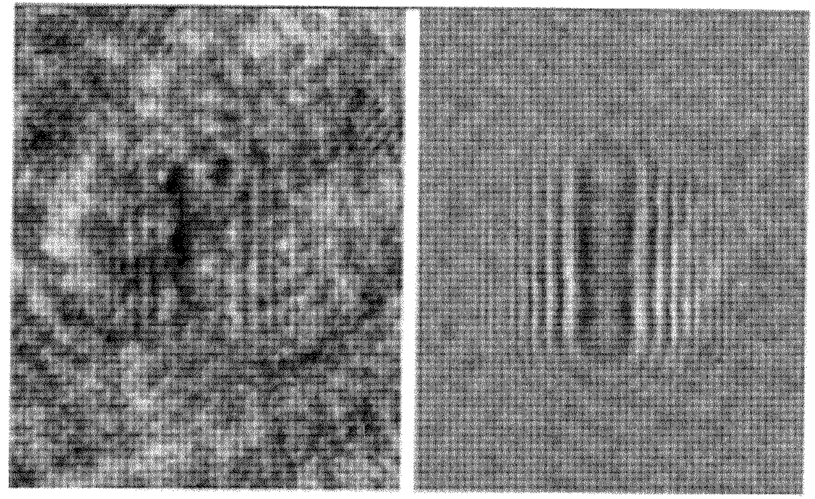
FIG. 5B
FIG. 5C

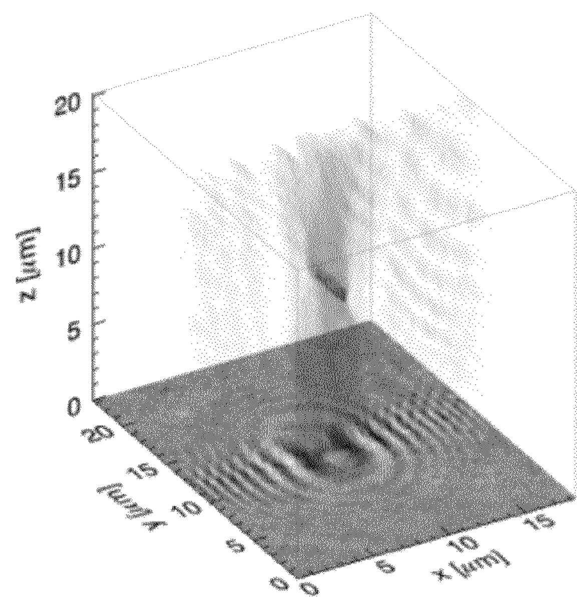
FIG. 6A
FIG. 6B
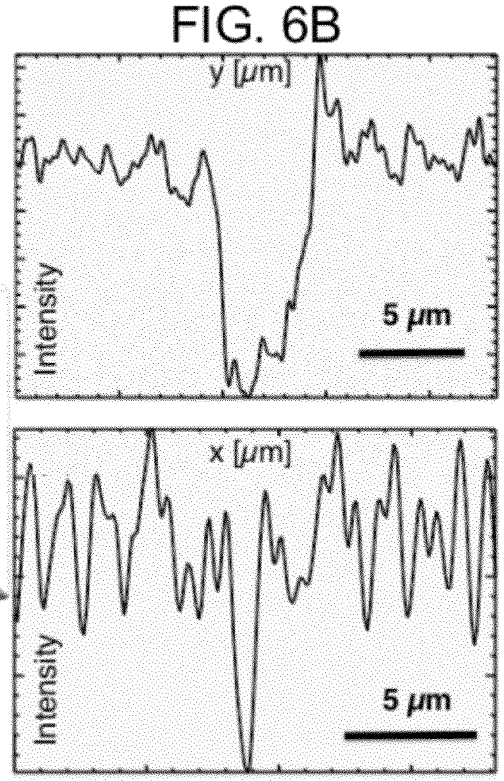
FIG. 6C

HOLOGRAPHIC MICROSCOPY OF HOLOGRAPHICALLY TRAPPED THREE-DIMENSIONAL NANOROD STRUCTURES

CROSS REFERENCE TO RELATED PATENT APPLICATIONS

The present application is a continuation-in-part of U.S. Utility application Ser. No. 12/020,376 filed Jan. 25, 2008, which claims the benefit of priority to U.S. Provisional Patent Application 60/897,784 filed Jan. 26, 2007, both of which are incorporated by reference herein in their entirety.

The U.S. Government has certain rights in this invention pursuant to grants from the National Science Foundation through Grant Number DBI-0629584 and Grant Number DMR-0606415.

This invention is directed to a holographic optical trapping system using optical traps generated by computer-established holograms to organize materials and apply microscope optics to inspect and analyze the materials in three dimensions (3-D). More particularly, a holographic video microscope system uses real-time resolved volumetric images of 3-D microstructures to carry out tracking and inspection of material assemblies, including 3-D translational and rotational diffusion of nanorods suspended in fluids.

BACKGROUND OF THE INVENTION

Holographic optical trapping uses computer-generated holograms to trap and organize micrometer-scale objects into arbitrary three-dimensional configurations. No complementary method has been available in the prior art for examining optically trapped structures except for conventional two-dimensional microscopy. Three-dimensional imaging would be useful for a variety of uses, such as verifying the structure of holographically organized systems before fixing them in place. It also would be useful for interactively manipulating and inspecting three-dimensionally structured objects such as biological specimens. Integrating three-dimensional imaging with holographic trapping might seem straightforward because both techniques can make use of the same objective lens to collect and project laser light, respectively. However, conventional three-dimensional imaging methods, such as confocal microscopy, involve mechanically translating the focal plane through the sample. Holographic traps, however, are positioned relative to the focal plane, and would move as well. The trapping pattern would have to be translated to compensate for the microscope's mechanical motion, which would add substantial complexity, would greatly reduce imaging speed, and would likely disrupt the sample undergoing examination and analysis.

Optical methods are increasingly widely used to manipulate and track nanostructured materials. The high-numerical-aperture optics required for such studies offer optimal spatial resolution, but severely restrict the accessible depth of focus to within a few micrometers. Confocal and deconvolution microscopies overcome this limitation by scanning through the sample and assembling the resulting axial slices into a volumetric data set. Scanning takes time, however, and so is of limited utility for studying the dynamic processes that evolve in three dimensions. Some implementations also require the sample to be fluorescently labeled, which may not be desirable. Scanning probe microscopy and electron microscopy both have superior spatial resolution, but typically are not compatible with three-dimensional micromanipulation techniques, particularly under environmental conditions. Consequently, there exists a need to efficiently manipulate and track nanostructured materials, particularly rod-shaped materials without the severe limitations of conventional methods.

SUMMARY OF THE INVENTION

Digital holographic microscopy solves a wide variety of prior art technical problems, providing real-time three-dimensional (3-D) imaging data without requiring any mechanical motion, including no need to translate the focal plane through the sample under analysis. A particularly compatible variant of in-line holographic microscopy replaces the conventional illuminator in a bright-field microscope with a collimated laser. Light scattered out of the laser beam by the object interferes with the remainder of the incident illumination to produce a heterodyne scattering pattern that is magnified by the objective lens and recorded with a video camera. This scattering pattern is a hologram of the trapped structure. Provided that this interference pattern is not obscured by multiple light scattering, it contains comprehensive information on the scatterers' three-dimensional configuration. Each two-dimensional snapshot in the resulting video stream encodes time-resolved volumetric information that can be analyzed directly, or decoded numerically into three-dimensional representations. This system and method enables ready commercial use of digital holographic microscopy in a holographic optical manipulation system, and uses the combined capabilities to directly assess both techniques' accuracy and establish any limitations. Techniques of quantitative holographic microscopy have been applied to homogeneous and coated spheres, but not previously to other shapes such as rods. Here we demonstrate methods to carry out high-resolution holographic tracking of nanorods, such as copper oxide, diffusing freely in three dimensions. The method provides advantageous three-dimensional tracking information at video frame rates.

Various detailed aspects of the invention are described hereinafter, and these and other improvements and features of the invention are described in detail hereinafter, including the drawings described in the following section.

BRIEF DESCRIPTION OF THE DRAWINGS

FIG. 3A illustrates a hologram recorded in an xy plane of a single sphere trapped at x=17 micrometers above a focal plane; FIG. 3B illustrates the real part of the scattered field reconstructed from FIG. 3A; FIG. 3C shows a hologram recorded with the sphere at x=0; FIG. 3D shows an axial section of the scattered field obtained by translating the subject colloidal sphere past the focal plane in $\Delta z=0.122$ μm micrometer steps; FIG. 3E shows an equivalent reconstruction using conventional illumination.

FIG. 5A(1) is a schematic representation of holographic video microscopy in another form of the invention wherein the sample scatters light from a collimated laser beam and both the scattered and unscattered laser light are collected by an oil-immersion objective lens and relayed to a video camera, which records the intensity of their interference pattern in 5A(2); FIG. 5B is an unprocessed holographic micrograph I(r) of an inclined CuO nanorod in water; and FIG. 5C is a normalized image b(r) of the nanorod;

FIG. 6A shows a numerically refocused version of FIG. 5C in the plane of best focus; FIG. 6B shows an intensity profile along the nanorod's axis indicating a length of 4.9 μm; and FIG. 6C shows intensity profiles transverse to the nanorod's axis indicating a diameter slightly less than 200 nm;

DETAILED DESCRIPTION OF PREFERRED EMBODIMENTS

Figure 1:
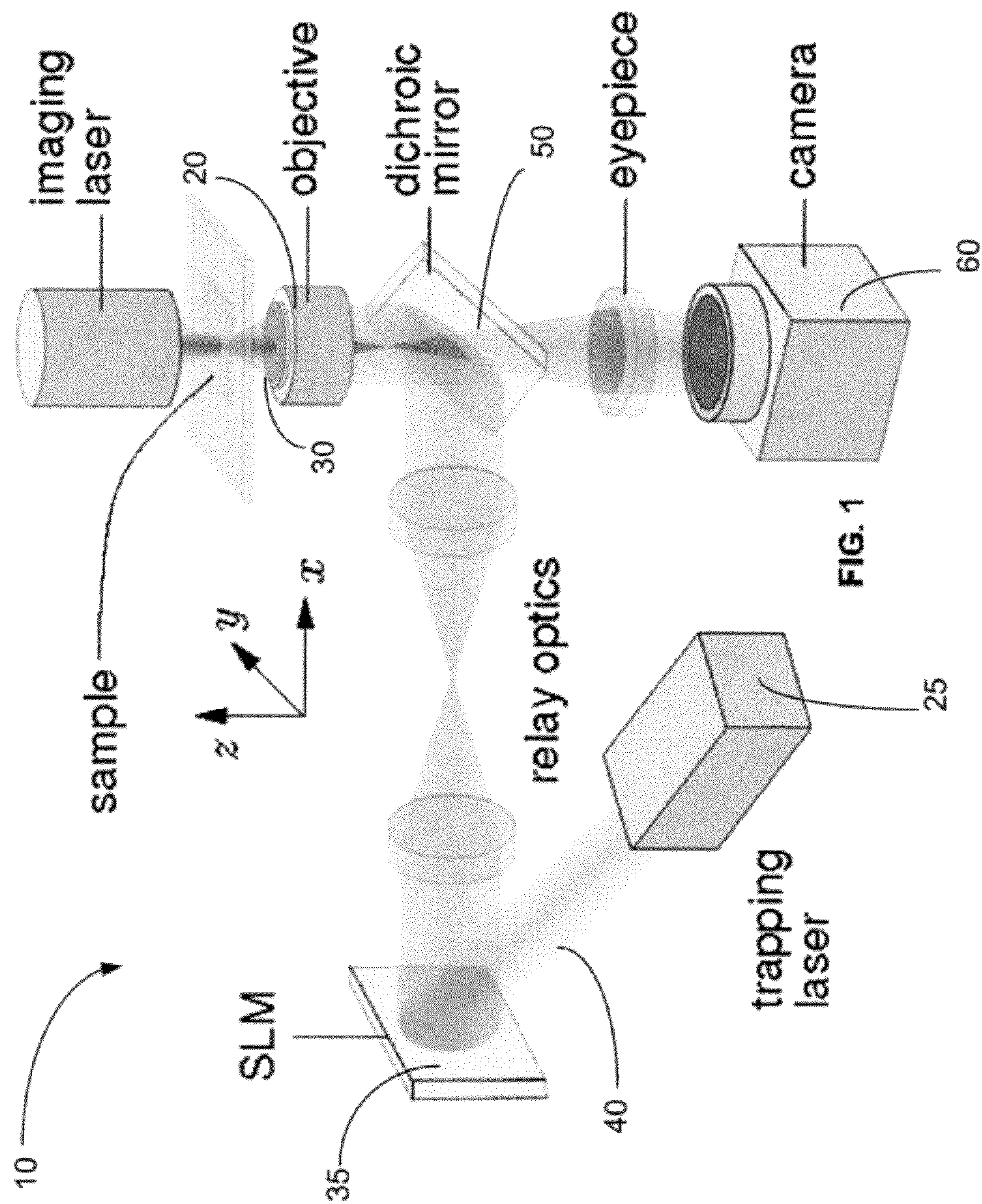
FIG. 1 illustrates a system constructed in accordance with one form of the invention.

FIG. 1 shows a schematic representation of an integrated system 10 constructed in accordance with one embodiment of the invention. The system 10 is based on an inverted optical microscope (such as, Zeiss Axiovert S100-TV) outfitted with a 100× NA 1.4 oil immersion objective lens 20. This lens 20 is used both to project holographic optical traps, and also to collect in-line holographic images of trapped objects. Holographic traps are preferably powered by a frequency-doubled diode-pumped solid state laser 25 (such as, a Coherent Verdi) operating at a wavelength of 532 nm to generate input laser beam 30. A liquid crystal spatial light modulator 35 (such as a Hamamatsu PAL-SLM X7550) imprints the beam's wavefronts with phase-only holograms encoding the desired trapping pattern. The modified trapping beam 40 then is relayed to the input pupil of the objective lens 20 and is focused into optical traps.

The trapping beam 40 is preferably relayed to the objective lens 20 with a dichroic mirror 50 tuned to the trapping laser's wavelength. Other wavelengths pass through the dichroic mirror 50 and form images on an image device 60, such as a CCD camera (such as, NEC TI-324AII) or other conventional image capture device. In a most preferred embodiment a standard combination of incandescent illuminator and condenser lens has been replaced with a helium-neon laser providing 5 mW collimated beam of coherent light at a wavelength of λ=632 nm in air. The system 10 further includes a computer for manipulation of sensed image data and analyzing the image data by executing calculations of all equations provided herein by conventional software known in the art. The computer can also include any conventional executable memory, such as a ROM, RAM, or other well known memory capable of storing a program, data or other instructions which can be executed to fulfill the analyzation functions described herein.

Figure 2A:
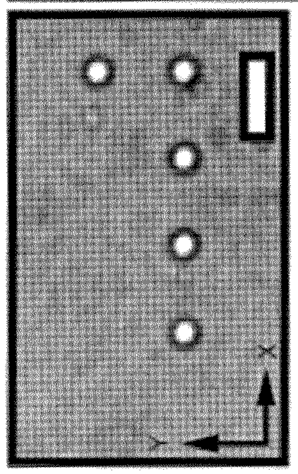
FIG. 2A illustrates a conventional bright-field image of five colloidal spheres trapped in an xy plane (the scale bar is 5 micrometers)
Figure 2B:
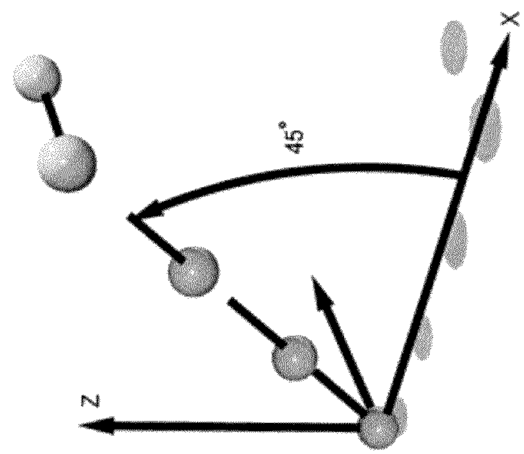
FIG. 2B illustrates the pattern of FIG. 2A rotated about a y axis by 45°.
Figure 2C:
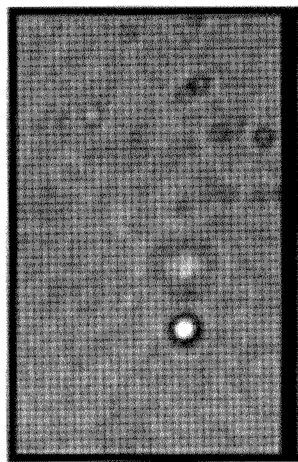
FIG. 2C illustrates a bright-field image of the rotated pattern of FIG. 2B as seen in the xy plane.

FIG. 2A demonstrates holographic imaging of colloidal spheres holographically trapped in a three-dimensional pattern. These 1.53 μm diameter silica spheres (Bangs Labs Lot No. L011031B) are dispersed in a 50 μm thick layer of water confined within a slit pore formed by sealing the edges of a #1.5 cover slip to the surface of a clean glass microscope slide. Each of the spheres is trapped in a separate point-like optical tweezer, and the individual optical traps are positioned independently in three dimensions. FIG. 2A shows a conventional bright-field image of the sphere or the particles arranged in a focal plane. Projecting a sequence of holograms with the trapping positions slightly displaced enables us to rotate the entire pattern in three dimensions, as shown in FIG. 2B. As the particles move away from the focal plane, their images blur, as can be seen in FIG. 2C. It is difficult to determine from this image whether the most distant particles are present at all.

Figure 2D:
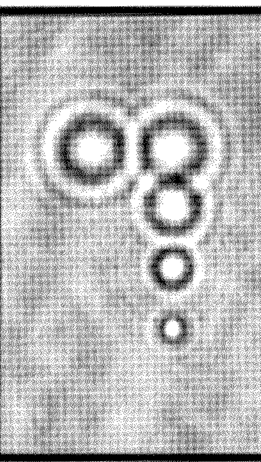
FIG. 2D illustrates a coherent image of the same structure as seen in the xy plane.

FIG. 2D shows the same field of view, but with laser illumination. Each of the particles appears in this image as the coherent superposition of the laser light it scatters with the undiffracted portion of the input laser beam. Other features in the image result from reflections, refraction and scattering by surfaces in the optical train of the system 10. These can be minimized by subtracting off a reference image obtained with no particles or trapped structure in the field of view.

Figure 2E:
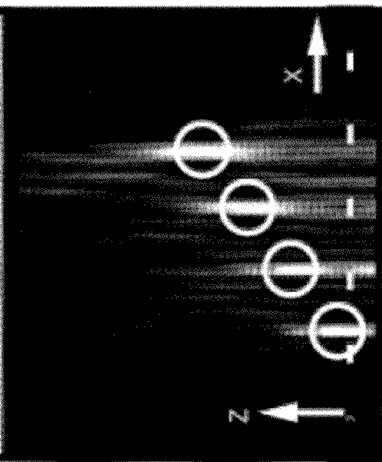
FIG. 2E illustrates a holographic reconstruction of an xz slice through the tilted pattern (circles denote the intended particle coordinates)

Enough information is encoded in two-dimensional real-valued images such as FIGS. 2A-2E to at least approximately reconstruct the three-dimensional complex-valued light field. The image in FIG. 2E is an example showing a numerically reconstructed vertical cross-section through the array of particles. This demonstrates the feasibility of combining holographic microscopy with holographic optical trapping. The reconstruction is consistent with the anticipated 45° inclination of the array, and with the calibrated 5.9 μm separation between the particles. Intended particle coordinates are shown as circles superimposed on the image. This quantitative comparison demonstrates the utility of holographic microscopy for verifying holographic assemblies. Because holographic images, such as FIG. 2D, can be obtained at the full frame rate of the video camera, holographic microscopy offers the benefit of real-time data acquisition over confocal and deconvolution microscopies.

In a most preferred embodiment, very accurate results can be obtained from use of the Rayleigh-Sommerfield formalism because holograms, such as in FIG. 2D form at ranges comparable to the light wavelength. The field u(r,z) scattered by an object at height z above the microscope's focal plane propagates to the focal plane, where it interferes with the reference field, a(r), comprised of the undiffracted portion of the laser illumination. The Rayleigh-Sommerfeld propagator describing the object field's propagation along optical axis is:

$$h_z(r) = -\frac{1}{2\pi}\frac{\partial}{\partial z}\frac{e^{ikR}}{R}, \tag{1}$$

where $R^2=r^2+z^2$ and $k=2\pi n/\lambda$ is the light's wavenumber in a medium of refractive index n. The field in the focal plane is the convolution $u(r,0)\otimes h_Z(r)$. The observed interference pattern, therefore, is $$I(r)=|a(r)|^2+2\Re\{a^*(r)(u\otimes h_Z)\}+|u\otimes h_Z|^2 \tag{2}$$

The first term in Eq. (2) can be approximated by measuring the intensity when no objects are in the field of view. FIG. 2D was obtained by subtracting such a reference image from the measured interference pattern. If we further assume that the scattered field is much dimmer than the reference field, the second term in Eq. (2) dominates the third. In that case, $$b(r) = \frac{I_0(r) - |a(r)|^2}{|a(r)|} \approx 2\frac{\Re\{a*(r)(u \otimes h_z)\}}{|a(r)|} \quad (3)$$

$$\approx 2\Re\{u \otimes h_z\} \quad (4)$$

provides a reasonable basis for reconstructing u(r). Ghosting can be minimized by translating trapped structures away from the focal plane.

Analyzing Eq. (3) can be simplified by assuming a(r)=1 for the reference field. In our application, however, the illuminating laser trapping beam 40 passes through an inhomogeneous sample before reaching the focal plane. Any resulting amplitude variations can be eliminated by normalizing I(r) with |a(r)|. Structure in the illumination's phase cannot be compensated in this way, and must be assumed to vary more gradually than any features of interest.

Reconstructing the three-dimensional intensity field is most easily performed using the Fourier convolution theorem, according to which $$B(q) \equiv \int_{-\infty}^{\infty} b(r)\exp(-iq\cdot r)d^2 r \quad (5)$$

$$\approx U(q)H_z(q) + U^*(q)H_z^*(q), \quad (6)$$

where U(q) is the Fourier transform of u(r,0) and $$H_z(q) = \exp\left(ikz\left[1 - \frac{\lambda q}{2\pi n}^2\right]^{\frac{1}{2}}\right) \quad (7)$$

is the Fourier transform of the Rayleigh-Sommerfeld propagator.

The estimate for the Fourier transform of the object field at height z' above the focal plane is obtained by applying the appropriate Rayleigh-Sommerfeld propagator to translate the effective focal plane:

$$B(q)H_{-Z'}(q) \approx U(q)H_{Z-Z'}(q) + U^*(q)H_{-Z-Z'}(q) \quad (8)$$

The first term in Eq. (8) is the reconstructed field, which comes into best focus when z'=z. The second is an artifact that is increasingly blurred as z' increases. Unfortunately, this term creates a mirror image around the plane z=0 with the result that objects below the focal plane cannot be distinguished from objects above. This ghosting is apparent in FIG. 2E.

Our final estimate for the complex light field at height z above the focal plane is $$u(r, z) \equiv |u(r, z)|\exp(i\phi(r, z)) \quad (9)$$

$$= \frac{1}{4\pi^2}\int_{-\infty}^{\infty} B(q)H_{-z}(q)\exp(iq\cdot r)d^2 q \quad (10)$$

Equation (9) can reconstruct a volumetric representation of the instantaneous light field in the sample under inspection from a single holographic snapshot, I(r). The image in FIG. 2E is a cross-section through the reconstructed intensity distribution, $|u(r,z)|^2$.

Each sphere in FIG. 2E appears as a bright axial streak centered on a relatively dark dimple at the object's three-dimensional position. Circles superimposed on FIG. 2E denote the intended three-dimensional positions of the spheres, which were used to compute the trap-forming hologram that arranged the spheres. The very good agreement between the optical traps' design and features in the resulting reconstructed field attests to the accuracy of both the projection and imaging methods.

Figure 3F:
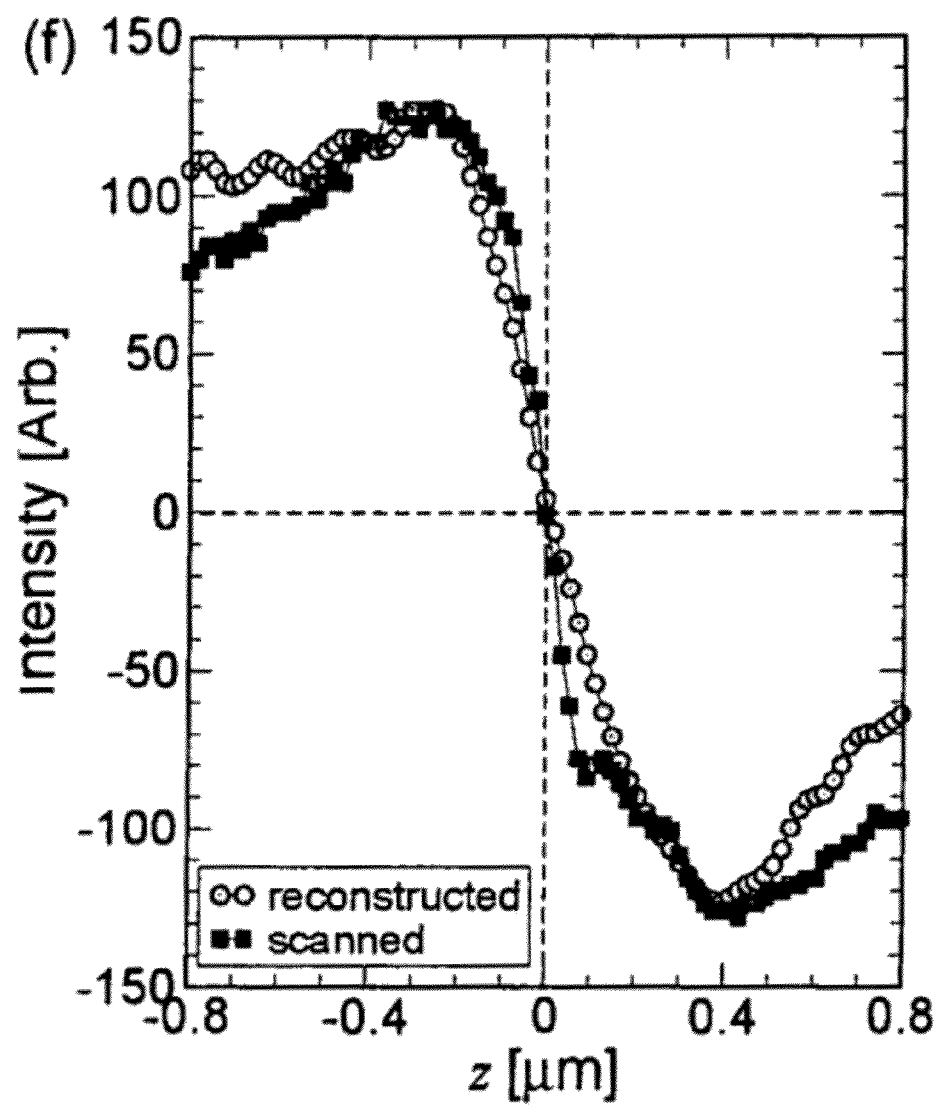
FIG. 3F illustrates axial intensity profiles from FIG. 3B and 3D, demonstrating accuracy of the axial reconstruction.

Contrary to previous reports in the prior art, images such as those in FIGS. 3A to 3F suggest that the axial resolution of our holographic reconstruction approaches the diffraction-limited in-plane resolution. FIG. 3A shows a hologram obtained for one of the spheres held by an optical tweezer at height z=17 μm above the focal plane. FIG. 3B is an axial section through the real part of field reconstructed from $\Re\{u(r,z)\}=|u(r,z)|\cos(\phi(r,z))$. This representation has the benefit of most closely resembling the scattering field observed in conventional three-dimensional bright-field microscopy. The sphere, in this case, is centered at the cusp between bright and dark regions. This crossover in the scattered field's sign creates a dark dimple in the intensity.

The effective axial resolution can be assessed by scanning the sphere past the focal plane and stacking the resulting images to create a volumetric data set. FIG. 3C is a hologram of the same sphere from FIG. 3A at z=0. Compiling a sequence of such images in axial steps of Δz=0.122 μm yields the axial section in FIG. 3D.

Structure in the spheres' images along the axial direction can be analyzed to track the spheres in z, as well as in x and y. For the micrometer-scale particles or the spheres studied here, for example, the centroid is located in the null plane between the downstream intensity maximum and the upstream intensity minimum along the scattering pattern's axis. Holographic microscopy of colloidal particles therefore can be used to extract three-dimensional trajectories more accurately than is possible with conventional two-dimensional imaging and far more rapidly than with scanned three-dimensional imaging techniques. In particular, in-plane tracking can make use of conventional techniques, and tracking in depth requires additional computation but no additional calibration.

Figure 4B:
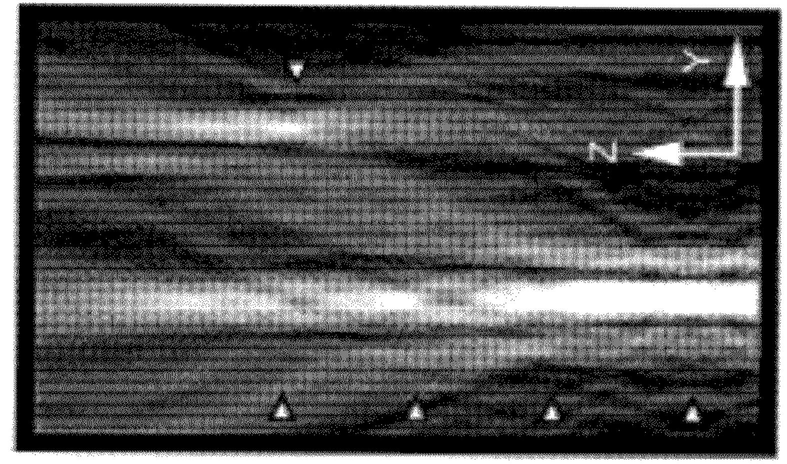
FIG. 4A shows resolution limits for occluded objects in the xy plane and FIG. 4B for the z plane.
Figure 4A:
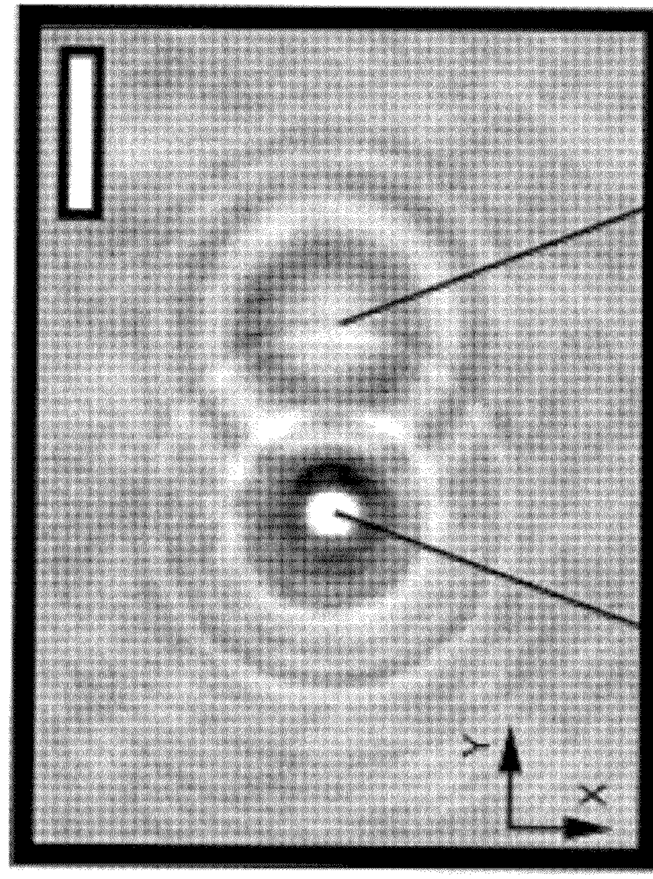

Analyzing images becomes far more challenging when objects occlude each other along the optical axis, as FIGS. 4A and 4B demonstrate. Here, the same pattern of the spheres from FIGS. 2A-2E has been rotated by 90°, so that four of the spheres are aligned along the optical axis 80. FIG. 4A is a detail from the resulting hologram and FIG. 4B is the holographic reconstruction in the vertical plane of the structure. The central observation from FIG. 4B is that all four of the spheres are resolved, even though they directly occlude each other. A fifth sphere, not directly occluded by the others was included as a reference, and is visible to the right of the others in FIGS. 4A and 4B.

The uppermost spheres in FIG. 4B appear substantially dimmer than those trapped closer to the focal plane; and FIGS. 4A and 4B compensate for this by presenting the amplitude |u(r,z)|, rather than the intensity, of the light field. The reference sphere, however, is no brighter than its occluded neighbor, and no dimmer than any of the spheres in FIGS. 2A-2E. Rather, the lower spheres act as lenses, gathering light scattered from above and focusing it onto the optical axis 80. As a result, these spheres appear substantially brighter than normal, and their images are distorted. Equation (9) does not take such multiple light scattering into account when reconstructing the light field.

The resulting uncertainty in interpreting such results can be mitigated by acquiring images from multiple focal planes, or by illuminating the sample under investigation from multiple angles, rather than directly in-line. Results also would be improved by more accurate recordings. Each pixel in our holographic images contains roughly six bits of usable information, and no effort was made to linearize the camera's response. The camera 60 was set to 1/2000 s shutter speed, which nonetheless allows for some particle motion during each exposure. A wider dynamic range, calibrated intensity response and faster shutter all would provide sharper, more accurate holograms, and thus clearer three-dimensional reconstructions.

With these caveats, the image in FIG. 4B highlights the potential importance of holographic imaging for three-dimensional holographic manipulation. The most distant particle appears displaced along the optical axis relative to the reference particle even though both were localized in optical tweezers projected to the same height. Three-dimensional visualizations confirm the structure of the projected trapping field. The apparent axial displacement was not evident for inclinations less than roughly 80°. It therefore reflects either a three-dimensional imaging artifact or, more likely, a real displacement of the particles from their designed configuration. This is reasonable because light from the traps projected closer to the focal plane exerts forces on particles trapped deeper into the sample. This effect is exacerbated by particles trapped closer to the focal plane, which deflect light onto more distant particles, altering their effective potential energy wells. This effect has been exploited for in-line optical binding of particles trapped along thread-like Bessel beams. Holographic imaging provides a means for measuring such distortions, and thus a basis for correcting them. This can be critically important for processes such as the holographic assembly of photonic heterostructures which rely on accurate placement of microscope such particles or other objects.

In-line holographic microscopy replaces the incandescent illuminator of conventional bright-field microscopy with a collimated coherent light source. In yet another embodiment of the invention, shown schematically in FIG. 5A, the light source 200 illuminates the sample 210 with a continuous-wave solid state laser light 220 (Coherent Verdi 5W) operating at a vacuum wavelength of $\lambda$=532 nm. The light 225 scattered by the sample 210 interferes with the unscattered portion 230 of the laser beam light in the focal plane of an objective lens 240 (Zeiss S Plan Apo, 100×, oil immersion, numerical aperture 1.4) mounted in an inverted optical microscope (Zeiss Axiovert TV 100 S which is not shown). The magnified interference pattern is projected by a video eyepiece (1×and not shown) onto a video or image collection device such as camera 260 (NEC TI-324AII), which records its intensity at 30 frames per second. The collected data can then be processed by a coupled computer system 270 which includes appropriate ROM and RAM devices enabling execution of various uploaded computer software to carry out the needed mathematical calculations and analysis to provide useful output information (video, digital and other output). This system provides a total magnification of 0:101 μm/pixel. Each holographic snapshot contains comprehensive information on the scatterers' shape, composition, position and orientation within the laser beam light 220. How to retrieve that information is clarified by considering how the image is formed.

We can model the incident field as a plane wave $$E_0(r,z)=u_0(r)e^{ikz}\hat{\epsilon}_0 \tag{11}$$

propagating along $\hat{z}$ with wavenumber $k=2\pi n_m/\lambda$, in a medium of refractive index $n_m$. Its amplitude $u_0(r)$ may vary with position r=(x,y), but we assume that its polarization $\hat{\epsilon}_0$ does not. An object located upstream of the microscope's focal plane scatters some of this incident beam, thereby creating the scattered field, $$E_S(r,z)=E_S(r,z)\hat{\epsilon}(r,z) \tag{12}$$

at position r and height z relative to the center of the focal plane. The scattered wave's complex amplitude $E_S(r,z)$, and polarization $\hat{\epsilon}(r,z)$ depend on the sample's shape, size and composition as well as its position and orientation relative to the coordinate system centered on the focal plane. The image in the microscope's focal plane at z=0 is therefore $$I(r)=u_0^2(r)+2\Re\{u_0(r)E_S(r,0)\hat{\epsilon}_0\cdot\hat{\epsilon}(r,0)\}+|E_S(r,0)|^2 \tag{13}$$

If the scattered field's dependence on the sample's position and composition are known, Eq. (13) may be fit to an experimentally obtained hologram to locate and characterize the sample. In the particular case of isotropic homogeneous colloidal spheres, such fits yield the position of each particle in a holographic snapshot to within a nanometer, and their radii and refractive indexes to within a part in a thousand. A holographic video sequence then provides time-resolved sequences of such single-particle measurements. This approach, however, is computationally intensive and requires an accurate and numerically stable model for light scattering by the sample. When such a model is not available, quantitative information still may be obtained by reconstructing a time-resolved three-dimensional snapshot of the scattered field from each recorded hologram.

Unprocessed holograms, such as the example in FIG. 5B, are marred by nonuniform illumination and artifacts due to light scattered by fixed objects and surfaces in the optical train. Previous studies addressed these imperfections either by subtracting a previously recorded background image or by normalizing with an estimate for the background's amplitude. We instead normalize by the illumination's intensity, $I_0(r)=u_0^2(r)$, to obtain $$b(r) = 1 + 2\Re\left\{\frac{E_s(r,0)}{u_0(r)}\hat{\varepsilon}_0\cdot\hat{\varepsilon}(r,0)\right\} + \frac{|E_s(r,0)|^2}{u_0^2(r)} \tag{14}$$

$u_0(r)$ is the amplitude profile of the incident beam, which we assume to be nearly featureless. In that approximation, $u_0(r)=u_0$, where $u_0$ is a constant electric field amplitude. $\hat{\epsilon}_0$ is the polarization of the incident illumination. This is a unit vector, which may be real or complex. In our reduction to practice, the incident light is linearly polarized along the x direction, so that $\hat{\epsilon}_0=\hat{x}$. Similarly, $\hat{\epsilon}_0(r,0)$ is the polarization of the wave scattered by the particle. Unlike the uniform polarization of the incident light, the outgoing wave has a polarization that depends on position. Our analysis proceeds on the assumption that the rotation of the polarization away from the incident polarization is small in the plane of the hologram. $\Re$ is a representation of the mathematical "real part" operator that takes the real part of a complex argument.

This normalization reduces additive artifacts to an additive constant and substantially suppresses multiplicative artifacts. The qualitative improvement can be seen in the normalized hologram in FIG. 5C. In practice, we obtain the background image for a moving object by computing the median intensity at each pixel over a time window long compared with the object's residence at any point. A running median filter then provides an updated estimate for $I_0(r)$ even if the background itself were to change over time.

The third term in Eq. (14) is likely to be smaller than the other two because the scattered wave diverges as it propagates to the focal plane, but the illuminating beam does not. Neglecting it is best justified for small samples located well above the focal plane. In this limit, out-of-plane rotations of the polarization also may be considered to be small. Assuming, furthermore, that the sample is optically isotropic, we may approximate $\hat{\epsilon}(r)\cdot\hat{\epsilon}(r,0)\approx 1$. Finally, if the illumination does not vary too substantially across the field of view, the reduced amplitude $\tilde{E}_S(r,0)\equiv E_S(r,0)/u_0(r)$ is merely the scattered amplitude in the focal plane normalized to unit intensity. These considerations then yield $$b(r)\approx 1+2\Re\{\tilde{E}_S(r,0)\}. \tag{15}$$

The scattered field at height z above the focal plane then can be reconstructed from Eq. (15) with $$\tilde{E}_s(r,-z)\approx\frac{e^{-ikz}}{4\pi^2}\int_{-\infty}^{\infty}B(q)H(q,-z)e^{iq\cdot r}d^2q, \tag{16}$$

where B(q) is the Fourier transform of b(r)−1 and where $$H(q,-z)=e^{-iz(k^2-q^2)^{1/2}} \tag{17}$$

is the Fourier transform of the Rayleigh-Sommerfeld propagator. Although Eq. (17) applies in the paraxial approximation, it yields more accurate results than the Fresnel approximation that often is applied to numerical reconstruction of holograms. The associated intensity $\tilde{I}_S(r,z)=|\tilde{E}_S(r,z)|^2$ is an estimate for the image that would be observed at r and z.

We now use this general formalism to track the translational and rotational motions of cylindrical nanorods diffusing in water. Copper oxide nanorods were prepared with the simple hotplate technique method. A substrate of Cu foil (99.99% purity, Sigma-Aldrich) was polished to remove the native oxide layer on the surface. It then was heated in a Thermolyne 4800 box furnace at 400° C. for 24 hours. The Cu substrate was returned to room temperature over 8 hours before being removed from the oven. After this treatment, the foil is covered with a uniform film of CuO nanorods, each less than five hundred nanometers in diameter and up to 100 micrometers long. The film can be peeled off of the remaining copper substrate and the nanowires separately dispersed by sonication in deionized water for 5 min.

A small droplet of this aqueous dispersion was sealed in the 100 μm thick gap between a glass microscope slide and a glass cover slip whose edges were bonded with Norland Type 81 optical adhesive. This sample then was mounted on the microscope for observation at room temperature. Less than 100 mW of light was projected into the sample over the 3 mm diameter of a Gaussian beam. This illumination was too weak to raise the temperature of the aqueous sample appreciably, to alter the nanorods' structure, or to exert measurable forces on the individual nanorods.

The image in FIG. 6A shows the numerically refocused image $\tilde{I}_S(r,z)$ of a freely floating nanorod whose axis was aligned approximately along the midplane of the sample cell, roughly 50 μm from either wall. The nanorod appears as a dark feature in $\tilde{I}_S(r,z)$ because it both absorbs and scatters the green illumination. The false-colored three-dimensional reconstruction was computed with axial steps of 101 nm, consistent with the in-plane resolution. The rays converging from the bottom of the reconstruction toward the center should be a faithful representation of the nanorod's light scattering pattern. Those features that continue upward through the focus are artifacts that arise because Eq. (16) assumes the medium to be homogeneous, an assumption that breaks down at the position of the nanorod. The field upstream of the nanorod should be featureless. Faint artifacts also are evident radiating upward and outward from the lower edge of the reconstruction, which are due to the twin image. For these reasons, $\tilde{I}_S(r,z)$ should not be considered a straightforward image of the nanorod, but nevertheless is useful for tracking its position and orientation in three dimensions.

The intensity profile along the nanorod's axis is plotted in FIG. 6B and suggests that it is 4.9±0.3 μm long. Nonuniformities in this axial trace recur in all of this nanorod's holograms, independent of its position and orientation. Consequently, they appear to be ascribable to irregularities in the nanorod itself rather than to nonuniformities in the illumination or artifacts of the holographic reconstruction. FIG. 6C shows a transverse intensity profile through the middle of the nanorod in the horizontal plane. The dip in the intensity has a full width at half-maximum of $\sigma_0$=280 nm, which reflects the nanorod's actual diameter s broadened by diffraction. A simple estimate based on Gaussian broadening, $$\sigma^2\approx\sigma_0^2-\frac{\lambda^2}{2n_m^2} \tag{18}$$

yields σ≈200±20 nm for the rod's diameter, which is consistent with results obtained for similar samples by electron microscopy.

We quantified the nanorod's three-dimensional position and orientation relative to the coordinate system centered on the focal plane by analyzing the deviation from background intensity of volumetric reconstructions such as those in FIGS. 6A-6C. Estimates for the nanorod's axis were computed by intensity-weighted skeletonization of $\tilde{I}_S(r,z)$. Those points identified as lying on the axis then are fit by linear regression to a line segment whose center is taken to be the estimate for the rod's position R(t)=(x(t), y(t), z(t)) at time t and whose orientation is the estimate for the nanorod's orientation $\hat{s}(t)$=(cos θ(t), sin ϕ(t), sin θ(t) sin ϕ(t), cos ϕ(t)), where θ(t) and ϕ(t) are polar and azimuthal angles respectively. The fit segment's length is found to be substantially independent of orientation even when the nanorod is oriented axially, as in FIG. 7B. This provides support both for the use of Rayleigh-Sommerfeld back propagation to reconstruct the three-dimensional intensity distribution and also for skeletonization as a means to locate the nanorod within reconstructed volumetric data.

Analyzing the volumetric reconstruction in this way is complementary to direct analysis of the hologram itself, which has proved fruitful for tracking colloidal spheres. It has the advantage of not requiring a specific model for light scattering by the rod, it is less sensitive to details of the scattering geometry, and also is far less computationally intensive. Consequently, Rayleigh-Sommerfeld volumetric imaging offers much-needed real-time feedback for optical micromanipulation techniques that increasingly are being used to assemble nanorods and nanowires into three-dimensional functional structures. It also makes possible real-time analysis of nanorods' three-dimensional rotational and translational Brownian motion.

A Brownian rod's rotational diffusion generally is independent of its translational motion and can be quantified through displacements of the orientational unit vector.

$$\Delta s^2(t) \equiv \langle|\hat{s}(t) - \hat{s}(0)|^2\rangle = 2\left[1 - \left(1 - \varepsilon\frac{2}{s}\right)\exp\left(-2D_r\left(t - \frac{\tau}{3}\right)\right)\right], \quad (19)$$

where the rotational diffusion coefficient is given by, $$D_r = \frac{3k_BT}{\pi nL^3}\left[1n\left(\frac{L}{\sigma}\right) - \gamma\right] \quad (20)$$

in a fluid of viscosity $\eta$. The constant $\gamma \approx 0.45$ depends on the detailed shape of the cylindrical rod and is known analytically only for special cases, such as prolate ellipsoids. Equation (19) also includes terms accounting for the mean-squared error $$\varepsilon\frac{2}{s}$$

in measurements of $\hat{s}(t)$ and for blurring during the $\tau$=1 ms exposure time of the camera. Measurements of $\Delta s^2(t)$ not only provide information on the nanorod's structure and dynamics, they also enable us to estimate the measurement error inherent in our holographic rod-tracking procedure.

Figure 7A:
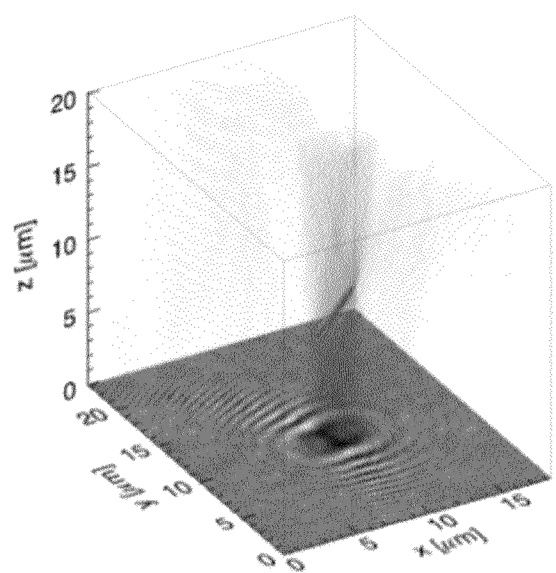
FIG. 7A shows volumetric reconstruction of a diffusing nanorod inclined at roughly 45° to the focal plane.
Figure 7B:
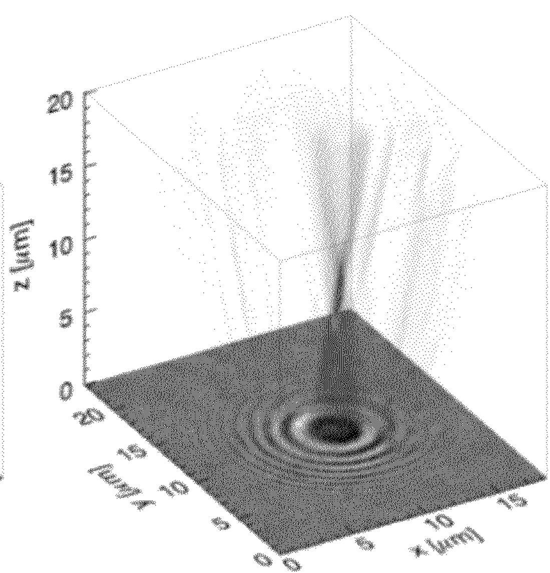
FIG. 7B shows being oriented nearly perpendicularly to the focal plane.
Figure 8A:
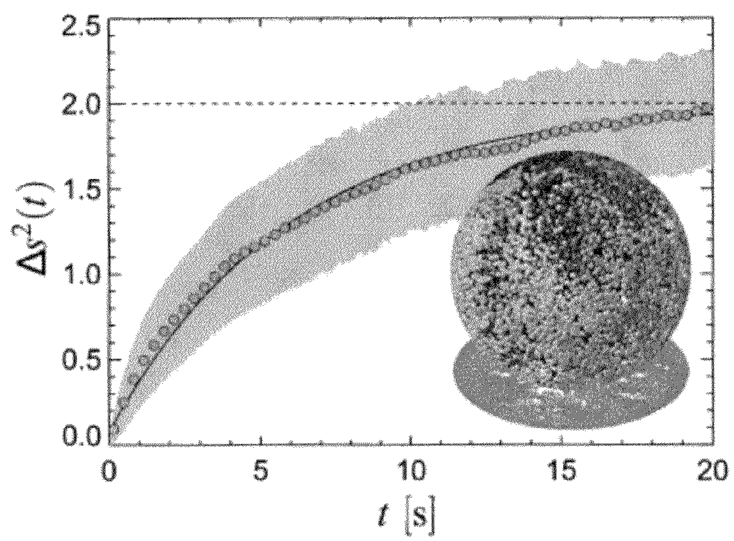
FIG. 8A shows evolution of the nanorod's mean-square orientational fluctuations together with a fit to Eq. 19; a shaded region indicates statistical uncertainty in $\Delta s^2(t)$; the inset shows the location of $\hat{s}(t)$ at ⅓ s intervals, colored by time.

FIG. 8A shows the evolution of $\Delta s^2(t)$ for the nanorod in FIGS. 7A and 7B obtained from a continuous 5 min trajectory recorded at ⅓o s intervals. The data agree well with the prediction of Eq. (19) and yield a rotational diffusion coefficient of $D_r$=0.0846 ±0.0004 $s^{-1}$, which is two orders of magnitude greater than the largest value accessible by confocal microscopy of nanorods in viscous media. The fit estimate for the error, $\epsilon_S$=0.02, corresponds to an error in orientation of roughly 3°. The associated characteristic rotation time $(2D_r)^{-1}$=5.9 s is short enough that the rod explores all orientations over the duration of the measurement, as can be seen in the inset to FIG. 8A.

Because a rod's viscous drag coefficient depends on its orientation, its translational diffusion is coupled to its rotational diffusion when viewed in the laboratory frame. Translational fluctuations are separable from rotations in the nanorod's proper frame of reference, however. Consequently, the axial and transverse projections of the center-of-mass translations satisfy the standard Einstein-Smoluchowski relations, $$\Delta R_{\parallel}^2 \equiv \langle|[R(t) - R(0)]\cdot\hat{s}(0)|^2\rangle = 2D_{\parallel}\left(t - \frac{\tau}{3}\right) + 2\varepsilon_{\parallel}^2 \text{ and} \quad (21)$$

$$\Delta R_{\perp}^2 \equiv \langle|[R(t) - R(0)]\cdot\hat{s}(0)|^2\rangle = 4D_{\perp}\left(t - \frac{\tau}{3}\right) + 4\varepsilon\frac{2}{\perp}, \quad (22)$$

with diffusion coefficients given by, $$D_{\parallel} = \frac{k_BT}{2\pi\eta L}\left[1n\left(\frac{L}{\sigma}\right) - \gamma\right] \text{ and } D_{\perp} = \frac{k_BT}{4\pi\eta L}\left[1n\left(\frac{L}{\sigma}\right) + \gamma\right]. \quad (23)$$

Equations (21) and (22) are corrected for the camera's exposure time. They also account for measurement errors $\epsilon_{\parallel}$ and $\epsilon_{\perp}$ along and normal to the nanorod's axis under the assumption that these errors are independent of orientation, $\hat{s}$. They omit higher-order dependence on $\epsilon_S$.

Figure 8B:
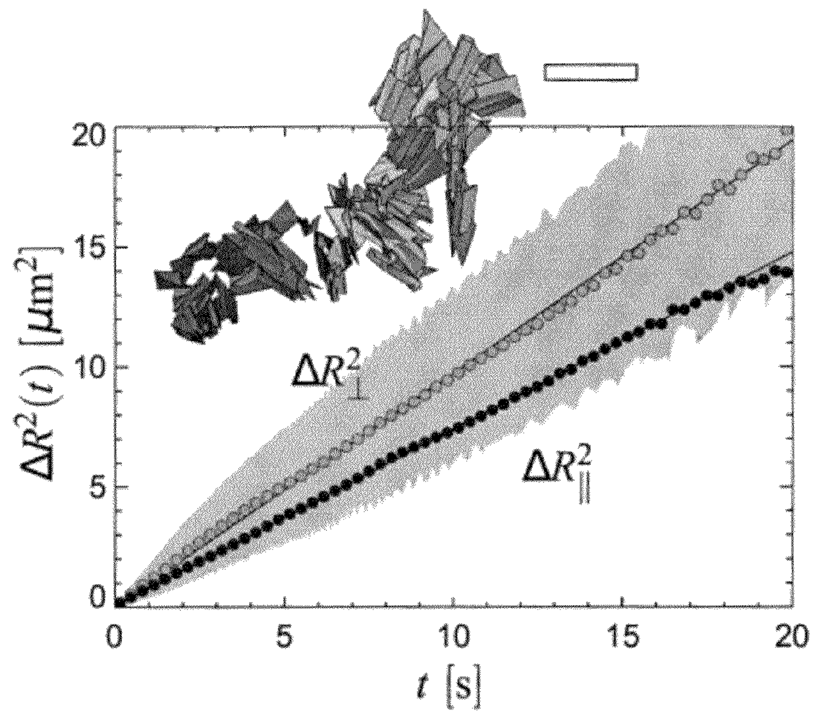
FIG. 8B shows evolution of the mean-square displacement along and transverse to the nanorod's axis and the shaded region indicates the statistical uncertainty in $\Delta R_\perp^2(t)$; the similar error range for $\Delta R_\parallel^2(t)$ is omitted for clarity; the inset shows displacement of the nanorod's center of mass R(t) during the first 20 s of the 5 min trajectory, plotted as a three-dimensional ribbon extended along the nanorod's orientation $\hat{s}(t)$. (Scale bar indicates 2 μm.)

Fitting Eqs. (21) and (22) to the data plotted in FIG. 8B yields $D_{\parallel}$=0.3691±0.0004 μm²/s and $D_{\perp}$=0.2426±0.0003 μm²/s. Given the experimental temperature, T=295.3±0.5 K, and the associated viscosity of water, $\eta$=0.955±0.001 cP, Eq. (23) then suggests that L=5.05±0.09 μm and $\sigma$=0.18±0.02 μm, both of which are consistent with results obtained directly from holographic imaging. From the same fits we obtain $\epsilon_{\parallel} \approx \epsilon_{\perp} \approx 100$ nm. This suggests that our procedure tracks the center of the nanorod to within roughly one pixel in all three dimensions.

Individual holographic video snapshots may be interpreted with Rayleigh-Sommerfeld back-propagation to measure the instantaneous three-dimensional position and orientation colloidal nanorods. Dynamical information obtained from sequences of holographic images agrees well with the predicted behavior of Brownian cylinders and confirms a measurement resolution of 100 nm in all dimensions. The technique's time resolution is limited only by the frame rate of the video camera. Rayleigh-Sommerfeld back-propagation has the advantage of providing a model-free approach to reconstructing the light field scattered by microscopic objects, and thus lends itself to high-speed processing and imaging. Holographic video microscopy thus can provide real-time feedback for three-dimensional micromanipulation of nanowires and nanorods. It also is useful for studying the rotational and translational motions of nanorods subjected to external forces. The present method described herein takes advantage of the comparative simplicity of single isolated nanorod's diffusion when viewed in the co-oriented frame of reference. The method is more difficult to implement when studying the coupled motions of multiple nanorods, so that measurements of nanorods' hydrodynamic and electrostatic interactions will be substantially more challenging than corresponding measurements on colloidal spheres. This complexity, however, arises from the underlying physics, rather than the technique, and constitutes an interesting and potential fruitful area of application for the methods described here.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of performing 3-D holographic microscopy of an optically trapped structure, comprising the steps of:

providing an optical microscope;

providing a light source;

generating a coherent light beam from the light source and the coherent light beam having an associated imaging wavelength input to the optical microscope;

generating a plurality of optical traps with wave fronts of a trapping laser beam having a phase only hologram encoding a desired optical trapping pattern and the trapping laser beam having an associated trapping wavelength;

providing an objective lens for the optical microscope, the objective lens both projecting the plurality of optical traps and collecting in-line holographic images of the optically trapped structure;

processing the in-line holographic images by a normalization procedure using illumination intensity $I_0(r)$ for the coherent light beam to obtain a normalized intensity b(r), thereby reducing additive artifacts to an additive constant and suppressing multiplicative artifacts to output a processed image;

providing the processed image of the optically trapped structure to a CCD camera for three-dimensional holographic microscopy of the optically trapped structure.

2. The method as defined in claim 1 wherein b(r) is, $$b(r) = 1 + 2\Re\left\{\frac{E_s(r,0)}{u_0(r)}\hat{\varepsilon}_0 \cdot \hat{\varepsilon}(r,0)\right\} + \frac{|E_s(r,0)|^2}{u_0^2(r)}$$

where, $E_s(r,0)=E_s(r,0)\hat{\epsilon}(r,0)$ $u_0(r)$ is the amplitude profile of the incident beam, which is assumed to be nearly featureless so that, $u_0(r)=u_0$, where $u_0$, is a constant electric field amplitude;

$\hat{\epsilon}_0$ is the polarization of the incident illumination and is a unit vector, which may be real or complex and the incident light is linearly polarized along the x direction, so that $\hat{\epsilon}_0=\hat{x}$;

$E_S$ (r,0) is the complex amplitude of the wave scattered by the particle;

$\hat{\epsilon}_0$ (r,0) is the polarization of the wave scattered by the particle; and $\Re$ is a representation of the mathematical "real part" operator that takes the real part of a complex argument.

3. The method as defined in claim 2 wherein b(r) is reduced to $b(r)\approx 1+2\Re[\tilde{E}_s(r,0)]$ and a scattered field intensity $\overline{E}_s(r,-z)$ at height $-z$ is derived from b(r) and thereby the scattered field intensity is $$\tilde{E}_s(r,-z) \approx \frac{e^{-ikz}}{4\pi^2}\int_{-\infty}^{\infty} B(q)H(q,-z)e^{iq\cdot r}d^2q$$

where B(q) is the Fourier transform of b(r)−1 and where $H(q,-z)=e^{-iz(k^2-q^2)^{1/2}}$ is the Fourier transform of the Rayleigh-Sommerfeld propagator thereby enabling tracking translational and rotational motion of the optically trapped structure.

4. The method as defined in claim 1 wherein the images include ghosting which can be minimized by translating the optically trapped structure from the focal plane.

5. The method as defined in claim 1 wherein a imaging laser beam is provided by a helium-neon laser having a collimated beam output.

6. The method as defined in claim 1 wherein the optical microscope includes a focal plane and no mechanical motion is necessary for performing three-dimensional holographic microscopy of the optically trapped structure.

7. The method as defined in claim 1 further including the step of subtracting off a reference image from the image formed at the CCD camera, thereby removing a varying background illumination when none of the optically trapped structure is present.

8. The method as defined in claim 1 wherein the images of the optically trapped structure include two-dimensional real-valued images for reconstruction of a three-dimensional complex-valued light field.

9. The method as defined in claim 1 including the additional step of analyzing the processed image using a Rayleigh-Sommerfeld formalism.

10. The method as defined in claim 9 wherein the Rayleigh-Sommerfeld formalism includes analyzing propagation of the optically trapped structure along an optical axis of the inverted optical microscope.

11. The method as defined in claim 10 wherein the optically trapped structure gives rise to a scattered field u(r,z) at a distance z upstream of a focal plane of the optical microscope and the scattered field u(r,z) is reconstructed by $$b(r) = \frac{I_0(r) - |a(r)|^2}{|a(r)|} \approx 2\frac{\Re\{a*(r)(u \otimes h_z)\}}{|a(r)|} \approx 2\Re\{u \otimes h_z\}$$

wherein $$h_z(r) = -\frac{1}{2\pi}\frac{\partial}{\partial z}\frac{e^{ikR}}{R}, \quad (1)$$

where $R^2=r^2+z^2$ and $k=2\pi n/\lambda$ is the light's wavenumber in a medium of refractive index n;

u is the amplitude; and a(r) is the reference field.

12. The method as described in claim 1 further including the step of reconstructing a 3-D light field u (r,z) of the images by solving, $$u(r,z) \equiv u(r,z)|\exp(i\phi(r,z)) = \frac{1}{4\pi^2}\int_{-\infty}^{\infty} B(q)H_{-z}(q)\exp(iq\cdot r)d^2q$$

wherein z is the height above the focal plane.

13. The method as defined in claim 12 wherein the light field u (r,z) is reconstructed from a single holographic snapshot of the processed image.

14. The method as defined in claim 13 further including the step of tracking movement of the optically trapped structure.

15. The method as defined in claim 13 wherein the optically trapped structure comprises a plurality of objects which are occluded and the three-dimensional images are reconstructed and the optically trapped structure is resolved in the reconstructed light field.

16. The method as defined in claim 1 further including a step of acquiring image data from multiple focal planes of the optical microscope, thereby enhancing accuracy of the images of the optically trapped structure.

17. A system for performing three-dimensional holographic microscopy of an optically trapped one dimensional structure, comprising:

an inverted optical microscope;

a laser source for producing a trapping laser beam;

a spatial light modulator for providing a phase-only hologram for imprintation on the trapping laser beam;

a laser source for producing an imaging laser beam;

an objective lens associated with the inverted optical microscope;

a CCD camera for detecting laser light arising from imaging of the optically trapped one dimensional structure and the CCD camera outputting image data;

a computer for analyzing the image data using computer software executed by the computer, the computer software including a routine to process the in-line holographic images by a normalization procedure using illumination intensity $I_0(r)$ for the coherent light beam to obtain a normalized intensity b(r), thereby reducing additive artifacts to an additive constant and suppressing multiplicative artifacts to output a processed image.

18. The system as defined in claim 17 further including a dichroic mirror disposed between the objective lens and the CCD camera.

19. The system as defined in claim 17 wherein the computer software comprises mathematical formalisms including Rayleigh-Sommerfeld determinations of light field b(r) for the laser beam received by the CCD camera.

20. The system as defined in claim 19 wherein the Rayleigh-Sommerfeld determinations comprise embedded computer software executed by the computer to calculate, $$b(r) = 1 + 2\Re\left\{\frac{E_s(r, 0)}{u_0(r)}\hat{\varepsilon}_0 \cdot \hat{\varepsilon}(r, 0)\right\} + \frac{|E_s(r, 0)|^2}{u_0^2(r)}$$

-continued where $$E_s(r, 0) = E_s(r, 0)\hat{\varepsilon}(r, 0)$$

$u_0(r)$ is the amplitude profile of the incident beam, which is assumed to be nearly featureless so that, $u_0(r)=u_0$, where $u_0$ is a constant electric field amplitude;

$E_s(r,0)$ is the complex amplitude of the wave scattered by the particle;

$\hat{\epsilon}_0$ is the polarization of the incident illumination and is a unit vector, which may be real or complex;

$\hat{\epsilon}_0$ (r,0) is the polarization of the wave scattered by the particle;

$\Re$ is a representation of the mathematical "real part" operator that takes the real part of a complex argument.

* * * * *